July 10, 1951 — M. J. RUSSO — 2,560,130
DEVICE FOR TEACHING ARITHMETIC
Filed Dec. 18, 1947 — 2 Sheets-Sheet 1

Inventor
Matthew J. Russo
By Shepherd & Campbell
Attorneys

July 10, 1951  M. J. RUSSO  2,560,130
DEVICE FOR TEACHING ARITHMETIC
Filed Dec. 18, 1947  2 Sheets-Sheet 2

Inventor
Matthew J. Russo
By Shepherd Campbell
Attorneys

Patented July 10, 1951

2,560,130

UNITED STATES PATENT OFFICE 2,560,130

DEVICE FOR TEACHING ARITHMETIC

Matthew J. Russo, Falls Church, Va.

Application December 18, 1947, Serial No. 792,438

4 Claims. (Cl. 35—31)

This invention relates to devices for teaching arithmetic and it has for its object to provide a simple and inexpensive device adapted to present to the pupil for solution a great number of problems in addition, subtraction, multiplication and division.

A salient feature of the invention and one which contributes largely to the novelty, compactness and capacity of the device is the provision of a fixed surface having a sight opening with an associated fixed number which constitutes one of the elements of each problem to be solved. An associated movable sheet has a group of numbers movable in a step by step movement past the sight opening, said numbers being so arranged that a number which constitutes the answer to problem #1 becomes an element which in conjunction with the fixed number, becomes problem #2 and so on throughout the group of numbers.

The invention will be best understood by reference to the accompanying drawings wherein.

Figure 1:
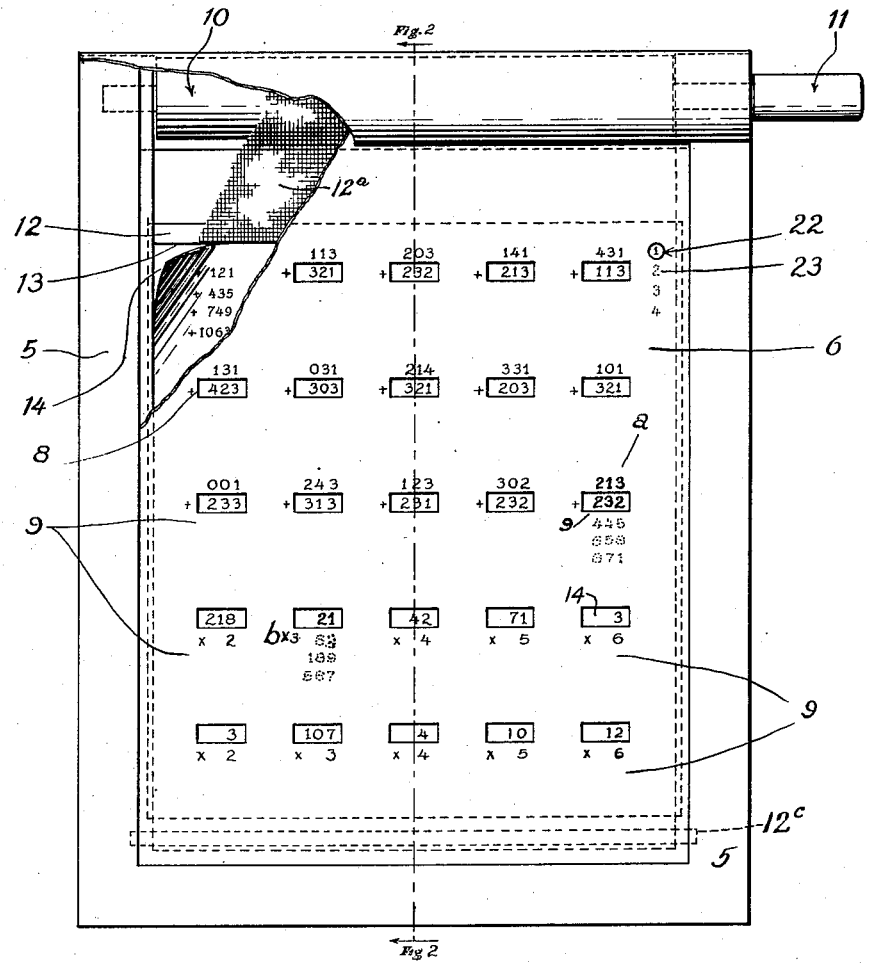
Fig. 1 is a face view of the device showing a side adapted for the teaching of addition and multiplication.
Figure 2:
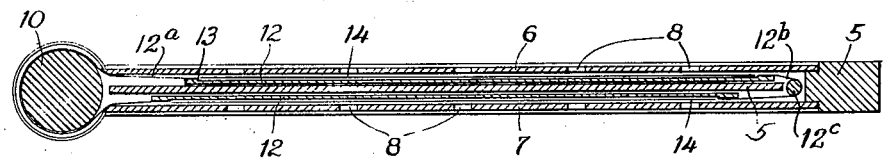
Fig. 2 is a vertical sectional view through the device.
Figure 3:
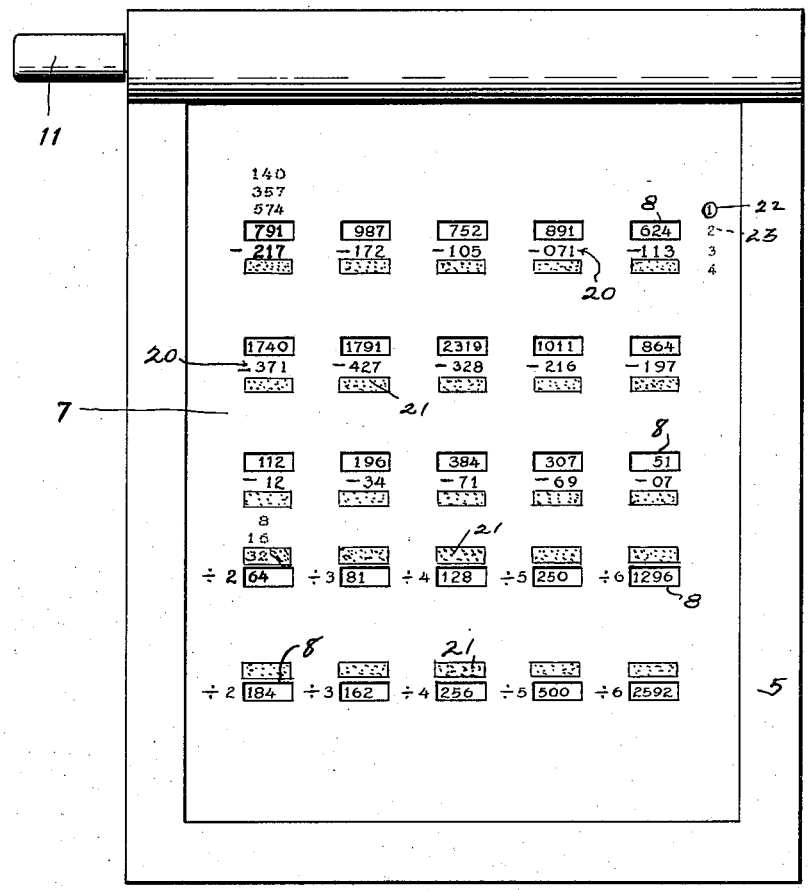
Fig. 3 is a view of the rear side of the device showing the same arranged for the teaching of subtraction and division.

The particular form of the device which I have chosen for purposes of illustration comprises a frame 5, a front plate 6 and a rear plate 7. These plates have sight openings 8 formed through them. Adjacent each sight opening is a number (a) constituting one of the elements of each problem to be presented at that particular sight opening. Also adjacent each sight opening is a small area 9 of a nature to be written upon, that is to say, if the plate 6 is formed of plastic or glass, the area 9 would be sandblasted or otherwise roughened to adapt it to be written upon with a lead pencil. However, the area 9 should also be of such a nature that whatever is written thereupon may be easily erased.

A roller 10 has a projecting handle 11 by which the roller may be turned back and forth so as to alternately raise and lower slides 12. To effect this the slides are connected to webs 12a, 12b of cloth or other suitable material, web 12a passing over manually actuated roller 10, (to be moved by said roller to actuate slides 12) and web 12b passing around an idler roll 12c. These slides are slightly recessed as indicated at 13 so that sheets of paper, linen or other suitable material indicated at 14 may be placed in their recessed faces and may thus be moved back and forth across the sight openings as the roller is turned. By thus arranging these slides and the removable sheets I am able to quickly remove one sheet with its numbers and substitute another. In this way a practically unlimited number of problems may be presented to the pupil.

The sheets 14 have numbers upon them arranged in groups and in such a way to cooperate with the fixed numbers (a) to present problems and they are arranged in the following novel way.

Referring, for example, to the fixed number 213, indicated at (a), it will be observed that the first number upon the sheet 14 is 232. It will also be observed that the other numbers arranged in the group illustrated by the dotted lines immediately below the number 232 are of such a nature that the first number concealed behind the plate 6 constitutes the answer in a problem of addition in which the numbers 213 and 232 are the numbers to be added.

When the numbers have been moved to the position illustrated, that is with the number 232 exposed, the pupil writes upon the surface 9 what he believes to be the proper solution of the problem. Then by turning the sheet 14 up one step under the influence of movement of the roller 10, the number 445 is brought before the sight opening and if 445 was the number which the pupil had written in the area 9 then the pupil knows that his solution is correct. Otherwise, he knows that it was in error and he sees what he must do to correct it. However, the invention goes even further than this in that the next number 658 constitutes the answer to a problem which consists of adding 213 to 445 because 445 in answering problem #1 has been turned up into a position to constitute with the fixed number 213 a second problem to which the number 658 is the answer and this continues through as many numbers as may be desired.

By virtue of this arrangement it will be seen that the numbers upon the sheet may be equidistantly spaced and this lends itself to the very simple step by step movement to be imparted to the roller 10, by handle 11.

While the invention is in no way limited to the particular arrangement of the problems upon the sheets, I may say that in the particular form of the invention illustrated the first three horizontal rows of openings upon plate 6 are devoted to problems in addition. The last two rows upon plate 6 are devoted to problems in multiplication. The first three rows upon the top of the plate 7 are devoted to problems in subtraction and the last two rows upon plate 7 are devoted to problems of division.

Taking, for example, a problem in multiplication it will be observed that in the space devoted to multiplying by 3 there is indicated the character 3 and the multiplication sign upon an area marked (b). The number appearing before the sight opening is 21. The next number out of sight is 63 being the answer to the action of multiplying 21 by 3. But 63 then becomes the problem in association with the number 3 and the next succeeding number is 189 representing the answer to the action of multiplying 63 by 3.

In the area set aside for problems of division upon plate 7 it will be observed that adjacent the sight opening 8 there is a division sign and also the number 2 indicating that the numbers which come in front of the sight opening 8 are to be divided by 2. The numbers upon the movable sheet in the rear of the sight opening 8 may, for example, run 8, 16, 32, 64, etc. Thus, while 16 constitutes the answer to the problem of dividing 32 by 2, it also constitutes the dividend of the problem of dividing 16 by 2 and the answer to which would be the numeral 8.

In like manner in the space set apart for problems of subtraction, there is adjacent each sight opening 8 a permanent number 20 which is adjacent an area 21 adapted to be written upon in the manner heretofore described. Upon the sheet in the rear of such sight opening there will be a group of numbers the first of which turned before the sight opening will in an operation of subtraction yield a number which will be the next succeeding number and which next succeeding number will when turned up in front of the sight opening, so that the pupil may find out whether his answer is correct, becomes an element in the next succeeding problem in subtraction and so on in the manner heretofore described with respect to problems in addition. Since, when one of the slides 12 moves upwardly the other moves downwardly, the numbers will be arranged to compensate for the direction of movement of the slides. However, since the pupil will be using only one side of the apparatus at a time, this makes no particular difference.

I contemplate providing the sheets 6 and 7 with sight openings 22 through which numbers 23 upon the sheet may be visible. These numbers will be the numbers of the various examples so that the teacher may give any desired instruction with respect to an example of any particular number.

It is clear that many ways may be resorted to for moving a number bearing sheet over sight openings for the purpose of teaching arithmetic. It is recognized that broadly this is old. However, as far as I am aware I am the first to provide adjacent a sight opening of this character a surface adapted to be written upon, and a permanent number and to associate therewith a sheet bearing a group of numbers so related that the answer to a first problem becomes an element of the next succeeding problem and so on throughout the group.

While I have described the plates 6 and 7 as having sight openings therethrough the same result could be achieved by the use of imperforate plates of glass or plastic in which transparent areas could take the place of the sight openings the remainder of the plates being opaque.

Having described my invention what I claim is:

1. A device for teaching arithmetic comprising, a fixed surface having a sight opening therein, a number bearing sheet movable therebehind, a fixed number on the fixed surface adjacent said sight opening, a writing surface on the fixed surface adjacent said sight opening and a group of numbers on the movable sheet disposed in position to be moved past said sight opening in step by step movement, said numbers of the movable sheet being such that the first of such numbers movable into sight when coacted with the fixed number in the solution of a problem yields an answer which corresponds to the second number which will move before said sight opening upon the next succeeding movement of the movable sheet, and wherein the third number which will move before the said sight opening upon a following movement of the sheet is such as to constitute an answer to a problem formed by the juxtaposition of the fixed and second numbers.

2. A device for teaching arithmetic comprising, a fixed surface having a plurality of sight openings therein, a number bearing sheet movable therebehind, a fixed number on the fixed surface adjacent said sight opening, a writing surface on the fixed surface adjacent said sight opening and a group of numbers on the movable sheet for each of the sight openings, the numbers of the said group being disposed in such position as to be moved past the respective sight openings in step by step movement, said numbers of the several groups being such that the first of the numbers of each group movable into sight at a sight opening in the movement of the sheet when coacted with the fixed number adjacent said sight opening in the solution of a problem yields an answer which corresponds to the second number of that particular group and which number will move before said sight opening upon the next succeeding movement of the movable sheet and wherein the third number of the several groups which move before the sight opening upon the following movement of the sheet is such as to constitute an answer to the problem formed by the juxtaposition of the fixed and second numbers and so on throughout all of the movements of the numbers of the several groups on the said movable sheet.

3. A device for teaching arithmetic comprising, an open frame having a rear face plate and a front face plate, each of said plates having a plurality of sight openings therein, number bearing surfaces between said plates, means for shifting said number bearing surfaces past said sight openings, said surfaces bearing numbers arranged in groups, said sight openings having fixed numbers adjacent thereto and writing surfaces adjacent thereto and the numbers of the several groups being in such relation that some of said numbers constitute the answers to the problems of which the fixed numbers and the preceding movable numbers constitute the elements and which answer constituting numbers themselves become elements of the next succeeding problems when moved into the sight openings and adjacent the fixed numbers associated therewith.

4. A device for teaching arithmetic comprising, a front face plate and a rear face plate each having a plurality of sight openings, a sheet carrying element mounted for movement behind each of said plates, sheets carrying plurality of groups of numbers mounted in said sheet carriers, manually operable means for shifting the sheet carriers, permanent numbers associated with the sight openings, and writing areas associated with the sight openings, some of the numbers upon the sheets being so arranged as to constitute the answers to problems presented by the association with the permanent numbers of other numbers upon the sheet and others of said numbers constituting the answers to problems constituted by the association of the permanent numbers with the said first named answer number.

MATTHEW J. RUSSO.

REFERENCES CITED

The following references are of record in the file of this patent:

UNITED STATES PATENTS

| Number | Name | Date |
|---|---|---|
| 574,815 | McClelland | Jan. 5, 1897 |
| 770,841 | Barker | Sept. 27, 1904 |
| 1,161,381 | Duffy | Nov. 23, 1915 |
| 1,161,685 | James | Nov. 23, 1915 |
| 1,618,560 | Walters | Feb. 22, 1927 |
| 1,641,982 | McDade | Sept. 13, 1927 |
| 1,687,130 | Hunau et al. | Oct. 9, 1928 |